United States Patent [19]

Soga et al.

[11] 4,405,370

[45] Sep. 20, 1983

[54] MAGNETIC INK REFINING METHOD

[75] Inventors: Mamoru Soga, Osaka; Wataru Shimotsuma, Ibaraki; Yoshio Kishimoto, Hirakata; Yoichi Sekine, Yokohama, all of Japan

[73] Assignee: Matsushita Electric Industrial Co., Ltd., Osaka, Japan

[21] Appl. No.: 264,562

[22] Filed: May 18, 1981

[30] Foreign Application Priority Data

May 20, 1980 [JP] Japan .................................. 55-67648
Jul. 28, 1980 [JP] Japan .................................. 55-103935

[51] Int. Cl.$^{3}$ .............................................. C09D 11/00

[52] U.S. Cl. ........................................ 106/20; 106/19; 252/62.54

[58] Field of Search .................. 106/20, 19; 252/62.54

[56] References Cited

U.S. PATENT DOCUMENTS 4,296,176 10/1981 Lennon et al. ........................ 106/20

*Primary Examiner*—Lorenzo B. Hayes
*Assistant Examiner*—Amelia B. Yarbrough
*Attorney, Agent, or Firm*—Stevens, Davis, Miller & Mosher

[57] ABSTRACT

A magnetic ink refining method according to which the fine magnetic particles dispersed unstably in the magnetic ink are sedimented and removed by applying a concentrated magnetic field to the magnetic ink composed of the fine magnetic particles dispersed in a dispersing medium in a colloidal state with a surface-active agent, and a picture recording device incorporating said refining system.

3 Claims, 5 Drawing Figures

MAGNETIC INK REFINING METHOD

FIELD OF THE INVENTION

This invention relates to a method for refining magnetic ink in a picture recording system where a magnetic fluid is used for picture recording, and a picture recording device incorporating such magnetic ink refining method.

SUMMARY OF THE INVENTION

This invention provides a magnetic ink refining method featuring removal, by means of forced magnetic sedimentation, of the macro-particles or unstable particles from the magnetic ink composed of the fine magnetic particles dispersed in a dispersing medium with a surface-active agent by making use of a concentrated magnetic field, and a practical picture recording device incorporating such ink refining techniques. The ink refining method according to this invention embraces both batch type and continuous type operations and is typified by its high refining efficiency and simplicity in its refining process as compared with the conventional centrifugal separating method. Further, the continuous type refining method of this invention, which is capable of performing continuous refining of magnetic ink, can be applied to a variety of practical picture recording devices using magnetic ink to display its maximam effect. The picture recording device incorporating the magnetic ink refining techniques of this invention can eliminate troubles occurring in picture recording due to settling of the magnetic particles in the magnetic ink.

DESCRIPTION OF THE PRIOR ART

Figure 1A:
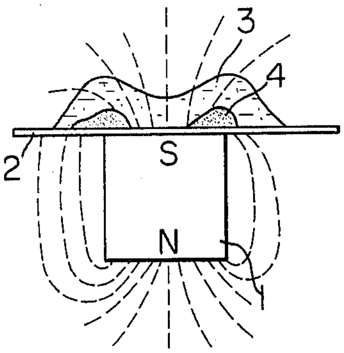
FIG. 1 (*a*) and (*b*) are side elevational views for illustrating settling of magnetic ink by application of a magnetic field.

The commercially available magnetic fluid used for picture recording is a liquid in which the fine magnetic particles with a particle size on the order of 100 A are colliodally suspended in a dispersing medium with a surface-active agent and which stays stable for a long time without causing sedimentation or flocculation of the particles. Generally, magnetite ($Fe_3O_4$) is used as the fine magnetic particles for ink. This substance is tinted in black and employed as black ink for the picture recording devices, and a variety of recording systems making use of its magnetic properties have been proposed. Paraffin, water, ester type oil, silicone oil and such are known as dispersing medium for said magnetic fluid while carboxylic acids such as oleic acid, linolic acid, etc., cationic surfactants, nonionic surfactants and the like are used as surfaceactive agent in such fluid. It is said that this magnetic fluid bears a superparamagnetism. For the preparation of said magnetic fluid, there are generally employed the following two methods: (1) wet particle synthesizing method and (2) pulverizing method. According to these known methods, the fine magnetic particles, which have been synthesized and dispersed, are finally subjected to centrifugal separation to remove the macro-particles which are undesirable matter for the magnetic fluid to obtain a stable colliodal suspension of the fine magnetic particles. For effecting centrifugal separation, usually a centrifugal force in the range of approximately 20,000–40,000 g (g: acceleration of gravity) is applied. When such magnetic fluid is used as magnetic ink, some necessary additives such as dye, coloring pigment, etc., may be contained beside the fine magnetic particles.

As a result of closer studies of the magnetic particles for their use as recording ink, the present inventors found that when the magnetic ink is left in a magnetic field for a long time, the magnetic particles in the ink are caused to flocculate and settle down in the magnetic field, particularly in the area where the magnetic field is concentrated, and even if the magnetic field is removed thereafter, they would not be soon re-dispersed. This phenomenon is detrimental to the innate properties of the magnetic fluid. Further researches into the cause of such phenomenon revealed that this phenomenon is ascribable to sedimentaition of a part of the magnetic particles which appears to be the macro-particles or unstable particles existing in the magnetic ink. It was also found that such magnetic sedimentation of the magnetic particles occurs when the magnetic ink is left for a long time in the area where the magnetic field is concentrated, in other words, in the area where dispersion of the lines of magnetic force is brisk, while no such magnetic sedimentation takes place when the ink is left for a short time in such area or when left in a parallel magnetic field, that is, the area where the lines of magnetic force run parallel to each other, regardless of the magnetic intensity in such area. The sedimentation of the magnetic particles in the magnetic field concentrated area depends on the intensity of the concentrated magnetic field and the gradient of concentration of the magnetic field. These phenomena are due to those magnetic particles which exist as impurities in the magnetic ink as said above, and it was thus revealed that refining of the magnetic ink can be accomplished most effectively by making use of a magnetic field rather than by conventional centrifugal separation techniques.

This magnetic sedimentation of impurities gives rise to various problems in practical use of magnetic ink. For instance, when magnetic ink is left in a magnetic field, the sedimentation-bound particles in the ink begin to settle down gradually to deposit at the location where the magnetic field is concentrated, and in case the ink is flowing slowly, the sedimentation-bound particles in the ink are gradually sedimented to form a sedimentary deposit which deprives the fluid of its mobility at said location. Particularly, in a recording device using such ink, said magnetic sedimentation takes place at the important portion of the head end where a magnetic field is applied, resulting in the impeded normal picture recording operation.

DESCRIPTION OF THE INVENTION

An object of this invention is to provide a magnetic ink refining method making use of a concentrated magnetic field, and said magnetic ink which causes no magnetic sedimentation of the fine magnetic particles therein.

Another object of this invention is to provide a picture recording device adopting said magnetic ink refining method making use of a concentrated magnetic field to keep free from any trouble originating in magnetic sedimentation of the magnetic ink.

In the following description of the invention, the mode of magnetic sedimentation of the magnetic ink particles as well as the process for refining the magnetic ink by means of a concentrated magnetic field will be explained in a concrete way.

Figure 1B:
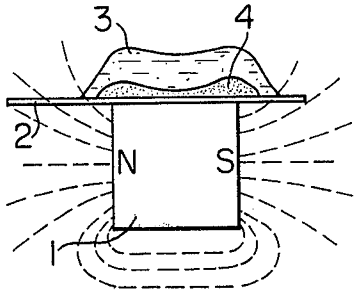

The fine magnetic particles existing in magnetic ink usually stay dispersed stable in a colloidal state and do not settle down even if left as they are for a long time. However, if magnetic ink 3 is adsorbed on a permanent magnet 1 through a magnetic plate 2 as shown in FIG. 1 and left as it is for a long time, a sedimentary deposit 4 is formed at the edge of the magnet 1. The term "magnetic sedimentation" used in this invention does not mean the type of sedimentation that occurs momentarily upon exposure to a magnetic field but means a phenomenon that when magnetic ink is left in a magnetic field for a long time, the fine magnetic particles in the ink settle down in the area where the magnetic field is concentrated. If the magnet of FIG. 1 is removed from the magnetic plate 2 and tilted, the magnetic ink 3 flows down and the sediment 4 along remains as no magnetic force acts to the magnetic plate under this condition. The amount of the sediment depends on the intensity of the magnetic field as well as the degree of concentration of the magnetic field. The term "degree of concentration of the magnetic field" is used here to refer to the gradient of divergence and convergence of the lines of magnetic force, and thus such degree of concentration of the magnetic field is defined as "zero" when the magnetic field applied is a parallel magnetic field. Therefore, the magnetic field is most likely to concentrate at the end of the magnetic pole, and hence the phenomenon of magnetic sedimentation of the fine magnetic particles is most apt to take place at this portion. Also, the term "concentrated magnetic field" used in this invention means a magnetic field with a high degree of concentration of the magnetic field and a high magnetic intensity. It is more effective to perform magnetic refining in a stronger concentrated magnetic field than the "practical" magnetic field which is actually used for recording with magnetic ink.

Magnetic refining according to this invention can be practiced according to either (1) batch type method or (2) continuous method. The batch type method, which is a static refining method, is high in refining efficiency but it requires long-time standing and is therefore uneconomical. The continuous method can be more readily applied and practiced as a practical system. In the case of this continuous method, a better refining effect is provided by flowing ink at as low a rate as it can be, and also the refining rate is increased and the magnetic ink purity is enhanced by providing the concentrated magnetic field in several stages.

The magnetic refining method according to this invention is described in further detail hereinbelow in accordance with the practical embodiments thereof.

EXAMPLE 1

Figure 2:
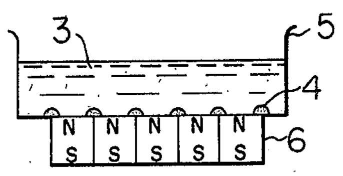
FIG. 2 is a structural diagram of the device implementing an embodiment of the ink refining method according to this invention.

1 Liter of an unrefined magnetic fluid 3 (saturation magnetization: 380 gausses, specific gravity: 1.358, viscosity: 23 cP (at 20° C.)) using paraffin as base oil was put into a 0.25 mm thick iron sheet made container 5 such as shown in FIG. 2, and the botton of said container was magnetically stuck to an array of 20 pieces of cylindrical alnico magnets 6 of 30 mm in diameter and 30 mm in height with the maximum surface magnetization of 1,000 G. Under this condition, the magnetic refining operation was performed repeatedly for a period of 7 days by removing the magnets once a day to get rid of the sediment 4 and then again setting the magnets in position. The sediment has decreased successively from 38 g→10 g→8 g→7 g→7 g→3 g→1 g as measured on a day-by-day system during the period of 7 days, and thus 7 days after start of the refining operation, there could be obtained in ink with the sediment of only 1 g, with the measurement accuracy of ±1.5 g or less. The measurements of the properties of the thus obtain magnetic ink showed saturation magnetization of 374 G, specific gravity of 1.351 and viscosity of 22.5 cP. There was thus noted a slight change in properties from the original fluid, but in the practical magnetic field of less than 1,000 G, no additional settling phenomenon was observed.

EXAMPLE 2

Figure 3:
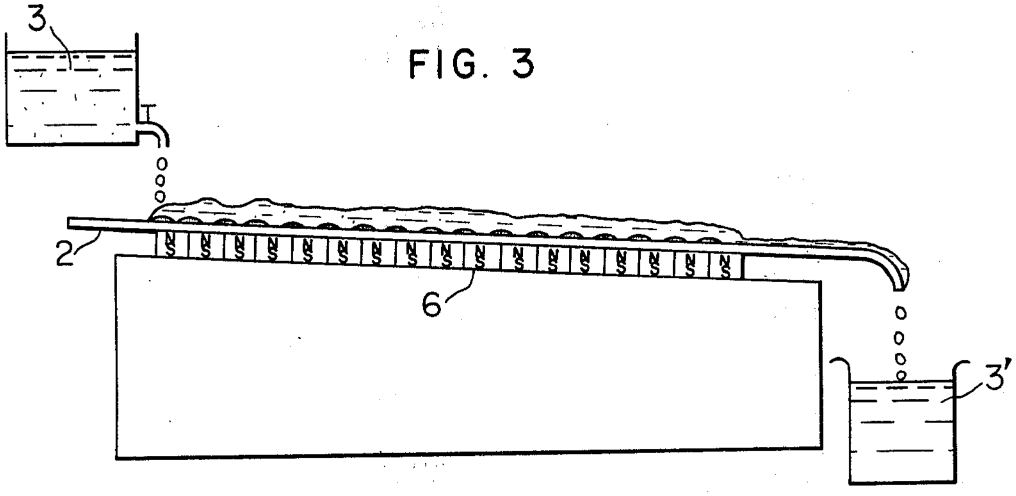
FIG. 3 is a structural diagram of the device implementing another embodiment of the refining method of this invention.

The same unrefined magnetic fluid 3 as used in Example 1 was refined continuously by the device shown in FIG. 3. Also, there were used the same magnets in the same number as in Example 1. The unrefined magnetic fluid was supplied at a flow rate of 3 cc/min. Determination of 1 liter of the resultantly obtained magnetic ink 3' showed saturation magnetization of 375 G, specific gravity of 1.352 and viscosity of 22.7 cP (at 20° C.). These property values are approximate to those of the refined ink of Example 1, and also no settling phenomenon was observed in the practical magnetic field as in the case of the refined ink of Example 1.

Now, an embodiment of the picture recording device to which the magnetic ink refining method of this invention has been applied is described with reference to the accompanying drawings.

EXAMPLE 3

Figure 4:
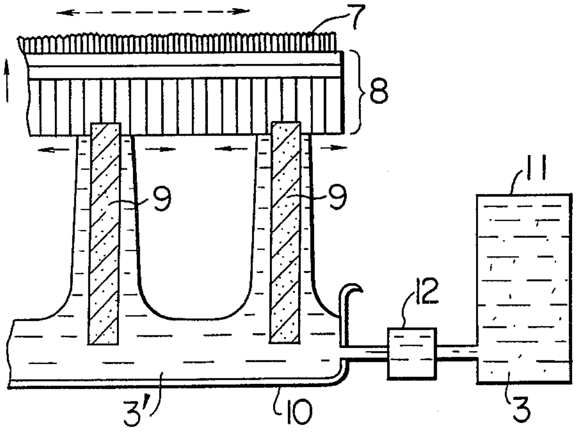
FIG. 4 is a structural diagram of the principal parts of a picture recording device incorporating the method of this invention.

A magnet 8 for raising the magnetic ink 3 was set as shown in FIG. 4 at the position of 300 μm from the end of a multi-stylus assembly 7 composed of 1,280 pieces of 60 μ-diameter coated iron wires arranged in a row at a density of 8 pieces/mm, and then an ink supply passage 9 made of a magnet was attached thereto. A sub-tank 10 was provided therebelow, and said supply passage 9 was steeped therein. Said sub-tank was connected to an ink tank 11, and a magnetic ink refining mechanism 12 was installed intermediate between said both tanks. When an unrefined magnetic fluid same as used in Example 1 was supplied from the ink tank, it was refined as it passed through the magnetic refining mechanism 12, and also settling of the magnetic particles in ink on the raising magnet at the head end was reduced strikingly, showing a significant improvement by this refining method.

Figure 5:
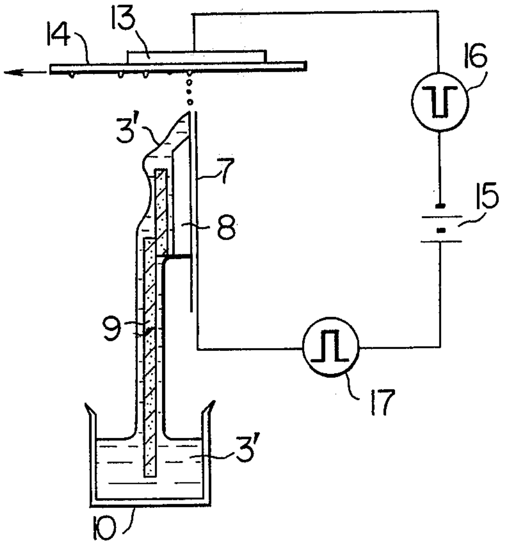
FIG. 5 is a side elevational view of the principal parts of said recording device.

The stylus assembly 7 of the multi-stylus head of this device was used as (+) electrode and said stylus head was set in opposition to the back electrode 13 with a spacing of 300 μm therefrom in an arrangement such as shown in FIG. 5, and a 60 μm thick recording medium 14 was placed in contact with said back electrode. After adjusting the height of the ink rise at the stylus end to 20 μm, a DC bias power source 15 and pulse power sources 16, 17 for flying the magnetic ink between said stylus assembly 7 and back electrode 13 were connected in series. When a recording experiment was carried out by using this device at a bias voltage of 1 KV and pulse voltage of 400 V, the ink was forced to fly out from the raised end and a clear picture was obtained. Also, when a continuous recording experiment was conducted by using this device, it was possible to perform continuous recording for several days, allowing stable formation of clear and vivid pictures. This is a suprising improvement in comparison with the conventional devices which would become incapable of continuous recording in about 2 hours due to magnetic sedimentation of the ink.

As described above, the magnetic ink refining method according to this invention is capable of eliminating the unnecessary macro-particles and unstably dispersed fine magnetic particles in the magnetic ink by applying a concentrated magnetic field to the ink, thereby providing a drastic improvement on the practical utility of magnetic ink. Further, the refining method of this invention can be widely utilized in the magnetic ink production processes and is also applicable to the magnetic ink containing additives such as dye, pigment, etc. Thus, the method of this invention spans a wide range of utilization.

Moreover, the picture recording device incorporating the magnetic ink refining mechanism of this invention is capable of stable supply of the clear recorded pictures even if it is used continuously for a long period of time, and further the performance of the recording device is amazingly improved.

What is claimed is:

1. A method for refining a magnetic ink containing unstable fine magnetic particles dispersed in a despersing medium in a colloidal state with a surface-active agent comprising settling said unstable particles and removing same by applying a concentrated magnetic field to the ink.

2. A method according to claim 1, wherein the concentrated magnetic field is applied from a permanent magnet disposed outside of the magnetic ink container.

3. A method according to claim 1, wherein the concentrated magnetic field is applied from a plurality of permanent magnets through a magnetic plate and said magnetic plate is tilted to let the magnetic ink thereon flow down.

* * * * *